United States Patent
Berke et al.

(10) Patent No.: US 9,509,532 B2
(45) Date of Patent: *Nov. 29, 2016

(54) DUTY-CYCLED EQUALIZATIONS

(71) Applicant: DELL PRODUCTS, L.P., Round Rock, TX (US)

(72) Inventors: Stuart A. Berke, Austin, TX (US); Bhyrav M. Mutnury, Round Rock, TX (US); Minchuan Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,478

(22) Filed: Nov. 4, 2015

(65) Prior Publication Data

US 2016/0056979 A1    Feb. 25, 2016

Related U.S. Application Data

(63) Continuation of application No. 14/331,907, filed on Jul. 15, 2014, now Pat. No. 9,210,007.

(51) Int. Cl.
  *H03H 7/30* (2006.01)
  *H04L 25/03* (2006.01)

(52) U.S. Cl.
  CPC ... *H04L 25/03146* (2013.01); *H04L 2025/037* (2013.01)

(58) Field of Classification Search
  None
  See application file for complete search history.

(56) References Cited

U.S. PATENT DOCUMENTS

2009/0103927 A1    4/2009  Cunningham et al.

*Primary Examiner* — Adolf Dsouza
(74) *Attorney, Agent, or Firm* — Isidore PLLC (57) ABSTRACT

An information handling system (IHS) selectively performs duty-cycled equalization of data transmission on a communication link between a sending component and a receiving component. A controller activates an equalizer associated with the communication link. Following equalizer convergence, the controller determines power consumption and/or data throughput corresponding to data samples propagated over the communication link. If power consumption and/or data throughput do not exceed respective specified threshold values, the controller maintains or applies continuous equalization. However, if power consumption and/or data throughput exceed the respective threshold values, the controller initiates duty-cycled equalization using a selected duty cycle value. The duty-cycled equalization activates the equalizer during the first interval to minimize accumulating inter-symbol interference (ISI) effects associated with a first set of data samples, and de-activates the equalizer during a second interval enabling a second set of data samples to bypass equalization, while satisfying power consumption and signal quality requirements.

18 Claims, 7 Drawing Sheets

DUTY-CYCLED EQUALIZATIONS

PRIORITY CLAIM

The present application is a continuation of and claims priority to U.S. patent application Ser. No. 14/331,907, titled "DUTY-CYCLED EQUALIZATION" filed on Jul. 15, 2014.

BACKGROUND

1. Technical Field

The present disclosure generally relates to information handling systems (IHS) and in particular to high speed link equalization within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems frequently communicate information for various applications using high speed serial interfaces. As signal speeds exceed 3-6 Gigabits per second (Gbps), the eye opening at the receiver may be insufficient for dependable operation in most high speed serial link applications that do not deploy advanced equalization techniques. This is due to the fact that ISI (Inter-Symbol Interference) increases as signaling frequency increases, a function of channel reflection, channel loss, and a myriad of other parasitic effects that cumulatively degrade the signal eye. Most High Speed Serial (HSS) interfaces like Serial Advanced Technology Attachment (SATA) 6 Gbps, Peripheral Component Interconnect Express (PCIe) Gen3 8 Gbps, and Serial Attached Small Computer System Interface (SAS) 12 Gbps exhibit this type of degradation. To mitigate these effects, most HSS links utilize power-hungry advanced transmitter (TX) and receiver (RX) equalization techniques. The transmitter techniques include TX equalization such as pre-emphasis, which is the amplification of high frequency components, and de-emphasis, which is the suppression of low frequency components. The pre-emphasis and/or de-emphasis implementations can reduce the ISI to ensure correct signal sampling at the receiver. The receiver techniques involve receiver gain settings such as CTLE (Continuous Linear Time Equalization), and receiver DFE (Decision Feedback Equalization) settings to open up what would otherwise be a closed receiver eye.

Unfortunately however, as signal speeds increase (and/or target channels lengthen), the complexity of the required TX and RX equalization circuitry increases. For example, additional equalization taps are added and more complex circuitry is employed for TX and RX Equalization. The added equalizer taps and increased complexity result in greatly increased channel/link power consumption due to equalization. In fact, in many of today's application specific integrated circuits (ASICs) and other semiconductor devices with high speed serial interfaces, I/O power is more dominant than core power and may reach 50-70% of the total device power consumption.

BRIEF SUMMARY

Disclosed are a method and an information handling system (IHS) that selectively performs duty-cycled equalization of high speed signal transmissions. According to one aspect, a controller activates an equalizer associated with a communication link established between a sender and a receiver. The controller determines power consumption and/or data throughput corresponding to data samples propagated over the communication link. If power consumption and/or data throughput do not respectively exceed specified threshold values, the controller maintains/applies continuous equalization. However, if power consumption and/or data throughput exceed threshold values, the controller initiates duty-cycled equalization using a selected duty cycle value. Using the selected duty cycle value, the controller performs duty-cycled equalization, which activates the equalizer during the first interval to minimize accumulating inter-symbol interference (ISI) effects associated with a first set of data samples, and which de-activates the equalizer during a second interval enabling a second set of data samples to bypass equalization while satisfying power consumption and signal quality requirements.

According to another aspect, the controller initiates duty-cycled equalization by evaluating at least one of (i) a length of a corresponding propagation path, (ii) an estimated amount of power savings, and (iii) a corresponding signal propagation speed. The controller performs this evaluation in order to determine whether to select a specific type of equalization from among periodic duty-cycled equalization and aperiodic duty-cycled equalization. The controller selects aperiodic duty-cycled equalization in response to an occurrence of at least one of the following conditions: (a) an identified propagation path is shorter than a threshold length; (b) signal propagation speed exceeds a threshold speed value; and (c) a threshold amount of power can be saved. However, the controller selects periodic duty-cycled equalization when none of the conditions for selecting aperiodic duty-cycled equalization occurs.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system (IHS) that selectively performs duty-cycled equalization of high speed signal transmissions. A controller activates an equalizer associated with a communication link between a sending component and a receiving component. The controller determines power consumption and/or data throughput corresponding to data samples propagated over the communication link. If power consumption and/or data throughput do not exceed specified respective threshold values, the controller maintains or applies continuous equalization. However, if power consumption and/or data throughput exceed respective threshold values, the controller initiates duty-cycled equalization using a selected duty cycle value. The controller's performance of duty-cycled equalization activates the equalizer during the first interval to minimize accumulating inter-symbol interference (ISI) effects associated with a first set of data samples, and de-activates the equalizer during a second interval enabling a second set of data samples to bypass equalization, while satisfying power consumption and signal quality requirements.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
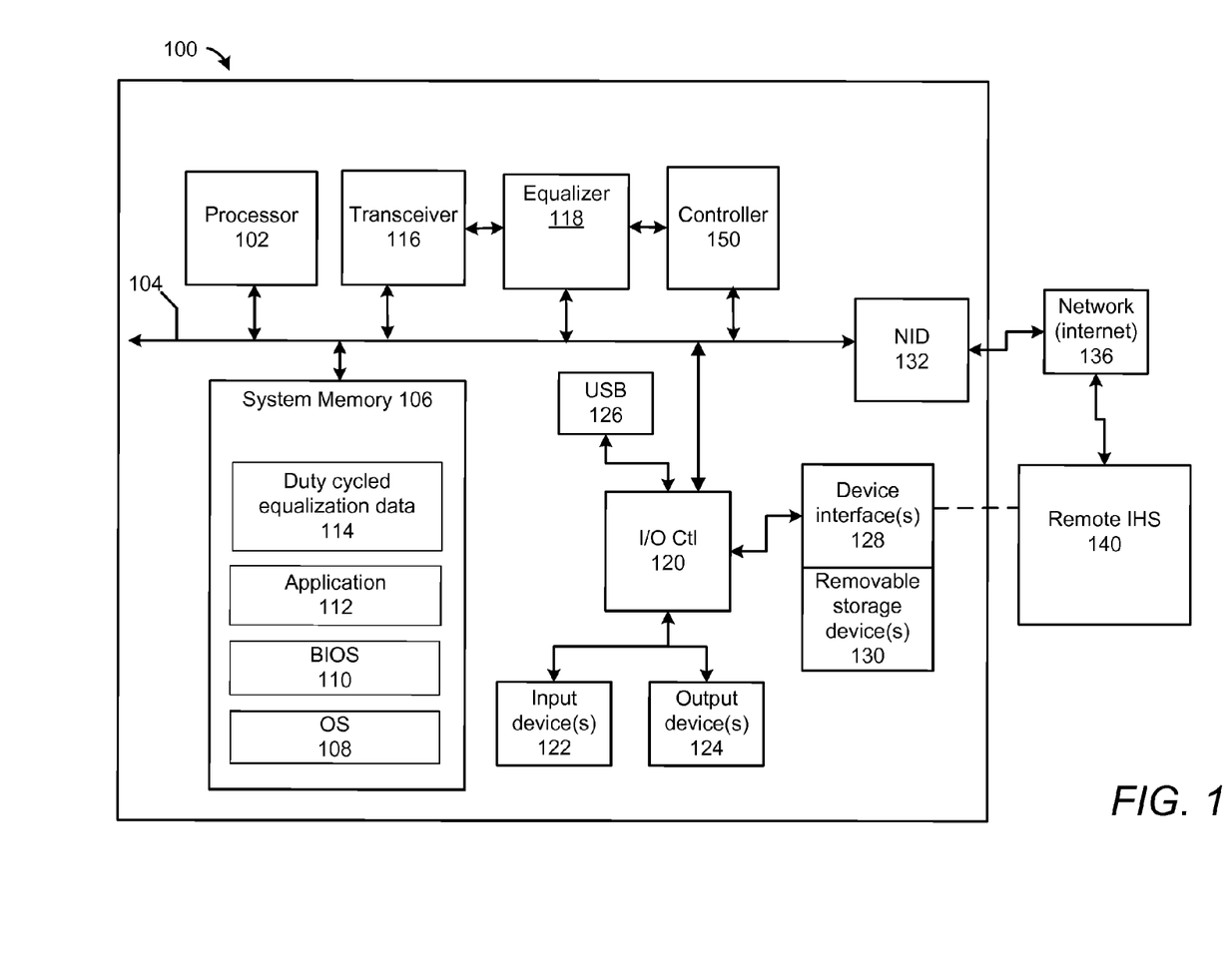
FIG. 1 illustrates an example information handling system (IHS) within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. As shown, system memory 106 can include therein a plurality of modules, including operating system (O/S) 108. In addition, system memory 106 includes basic input/output system (BIOS) 110, application(s) 112 and firmware (not shown). The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include general purpose I/O interfaces such as $I^2C$, SMBus, and peripheral component interconnect (PCI) buses.

IHS 100 also comprises at least one transceiver 116 which can include a transmitter (TX) and/or a receiver (RX) (not explicitly shown) and equalizer 118. In addition, IHS 100 comprises controller 150 which is communicatively coupled to both transceiver 116 and equalizer 118. As a result of these connections, controller 150 is able to communicate with transceiver 116 and is also able to selectively activate and deactivate equalizer 118.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136.

Network 136 can be a local area network, wide area network, personal area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
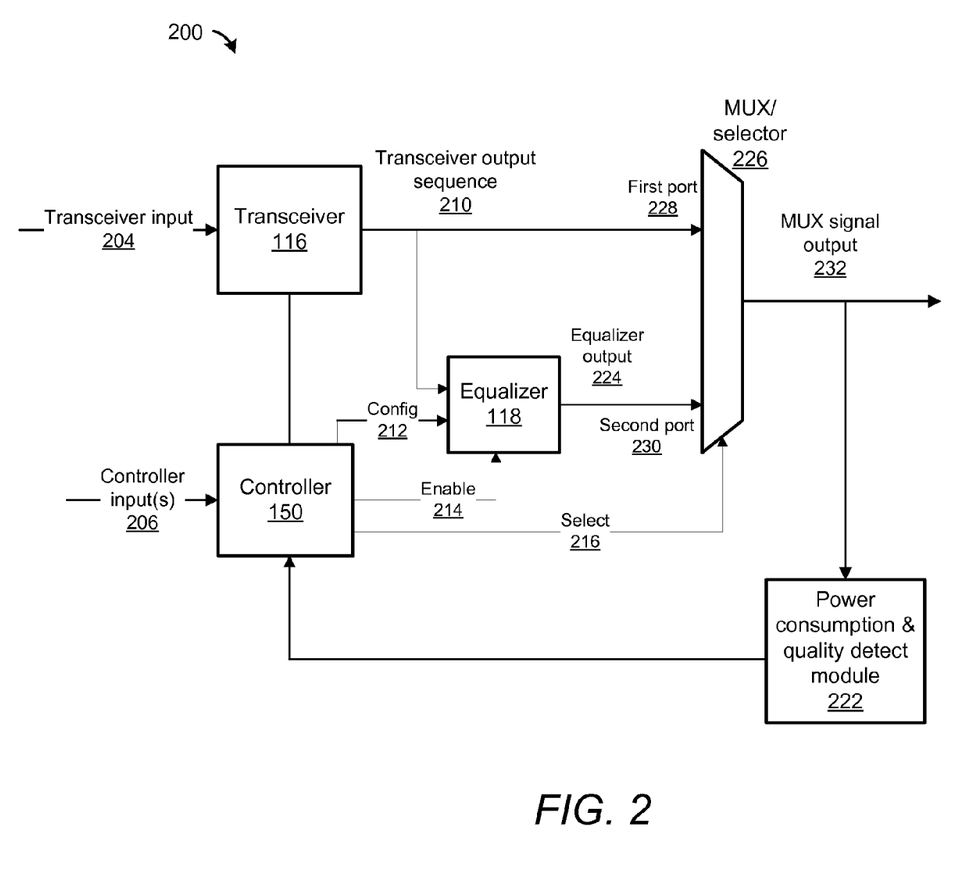
FIG. 2 depicts a block diagram representation of an equalizer circuit (EC) component within the IHS, according to one or more embodiments.

With specific reference now to FIG. 2, there is depicted a block diagram representation of an equalizer circuit (EC) component 200 within IHS 100, which provides functional aspects of the described embodiments. As illustrated in FIG. 2, EC component 200 comprises transceiver 116 and equalizer 118, which is coupled to an output of transceiver 116. EC component 200 also comprises multiplexer (MUX)/selector 226 which is coupled to outputs of both transceiver 116 and equalizer 118, respectively. In addition, EC component 200 comprises controller 150. Controller 150 is coupled to transceiver 116, equalizer 118 and MUX/Selector 226. Also illustrated within EC component 200 is power consumption and quality detection module 222 which is communicatively coupled to controller 150. In EC component 200, transceiver input 204 is received by transceiver 116 which yields transceiver output sequence 210. Transceiver output sequence 210 is received by both equalizer 118 and MUX/selector 226. In one embodiment, transceiver 116 represents a receiving component and transceiver input 204 is a high speed signal transmission origination from a corresponding sending component. In another embodiment, transceiver 116 represents a sending component and MUX signal output 232 represents a high speed signal transmission that is being propagated to a corresponding receiving component. In this implementation, transceiver input 204 represents configuration and/or control data.

Controller 150 activates equalizer 118 in order to provide equalization for transceiver output sequence 210 propagated by a transceiver 116 over an established communication link or interface. In one implementation, the communication link is a high speed link or interface such as SATA 3.0. In one implementation, following equalizer activation, link adaptation or 'training' begins by propagating reference signals over the high speed communication link. During link adaptation, equalizer filter coefficients are allowed to converge from an initial state to a final/convergence state that minimizes the mean square error between received training signals and the corresponding reference signals. Equalizer 118 performs link adaptation to enable convergence for the transmitter and receiver pair. Following TX and RX equalizer convergence, controller 150 detects signal propagation by transceiver 116. Using power consumption and quality detection module 222, controller 150 determines power consumption corresponding to equalizer operation and data throughput associated with an initial or current equalization mode. In one embodiment, the initial or current equalization mode is a continuous equalization mode. When controller 150 activates the continuous equalization mode, controller 150 configures MUX/selector 226, using select signal 216, to propagate equalizer output signal 224 to an output port of MUX/selector 226 yielding MUX signal output 232.

Controller 150 determines whether the power consumption and/or throughput corresponding to equalization performed on output sequence 210 exceed respective threshold value(s). If the power consumption and/or throughput corresponding to equalization performed on output sequence 210 exceed respective threshold values, controller 150 maintains or applies continuous equalization. However, if the power consumption and/or throughput corresponding to equalization performed on output sequence 210 do not exceed respective threshold values, controller 150 switches to a duty-cycled equalization mode.

Controller 150 performs duty-cycled equalization using a first duty cycle value selected from a range of acceptable duty cycle values for power performance and/or throughput values. In one embodiment, controller 150 activates equalizer 118 for a first set of data samples from the output sequence 210 and deactivates equalizer 118 for a second set of data samples, according to the first duty cycle value. Whenever equalizer 118 is activated during duty-cycled equalization, controller 150 propagates equalizer output signal 224 to an output port (232) of MUX/selector 226. However, whenever controller 150 deactivates equalizer 118 during duty-cycled equalization, controller 150 propagates transceiver output sequence 210 at first input port 228 to the output port of MUX/selector 226 to provide MUX output signal 232.

In general, controller 150 optimizes power consumption levels by switching transmitter (TX) and receiver (RX)

equalization between an ON state and an OFF state in a "duty-cycled" manner while the link is operating. Controller 150 performs this duty-cycled equalizer operation without reducing the effective receiver eye or without increasing the transmission Bit Error Rate (BER). Duty-cycled equalization provides substantial input/output (TO) power savings (e.g., within a range of 10-100 seconds of milliwatt (mW) per high speed serial (HSS) link signal pair, while still ensuring robust signal/link quality. Depending on the selected HSS link interface, the power savings can range between 30-70 percent (%) of total device power consumption.

As described, controller 150 applies duty-cycled equalization to prevent significant cumulative ISI effects from causing a corresponding "receiver eye" from collapsing at high speeds, while satisfying power consumption and signal quality requirements. These cumulative ISI effects can occur when over several hundred thousand bits are being transferred, as shown through empirical simulations, theory, and as validated by lab measurements. Controller 150 enables a transfer of only a few thousand bits with equalization placed in the ON state. Controller 150 then places equalization in the OFF state for a transfer of a next few thousand bits. As a result, controller 150 applies equalization in a duty-cycled manner in which the equalizer is selectively activated and deactivated during the transfer of data. Consequently, controller 150 prevents potentially significant and accumulating ISI effects from saturating and from closing the receiver eye. Furthermore, by selectively activating equalization for a first interval or first number of data samples and selectively deactivating equalization for a second interval or second number of data samples, controller 150 provides substantial power savings while also maintaining/improving overall signal quality. Controller 150 activates equalization to remove the accumulating ISI effects and prevent accumulating ISI side-effects from impacting signal quality. Having removed the accumulating ISI effects during the first interval, controller 150 is then able to de-activate equalization for a duration of the second interval. In one embodiment, controller 150 is able to repeat this duty-cycled equalization for any selected length of time and/or number of cycle periods.

According to one aspect of the disclosure, controller 150 is able to adaptively place the TX and RX equalization into an ON state or an OFF state, depending on a number of parameters or factors which can include the serial link characteristics, topology, and the implemented data encoding method. Furthermore, controller 150 selectively activates and deactivates an equalizer for respective time intervals based on the fact that equalization selectively applied to a smaller finite number of bits can result in an open receiver eye, as the ISI effects do not have a chance to saturate.

In one embodiment, controller 150 uses a hardware mechanism to signal a transmitter and/or receiver to turn the respective equalization circuits ON or OFF. In another embodiment, controller 150 uses a selective activation/deactivation mechanism that is implemented using combinations of hardware, firmware and/or software. In one example implementation involving a High Speed SERDES (HSS) in which TX and/or RX equalization is performed, the system BIOS may program the required time ON and time OFF into HSS SERDES control/status registers (CSRs) during initialization or training phases, and hardware counters are used to track the turn ON/OFF times. In another embodiment, the system firmware or system management agent may turn the equalization circuits ON or OFF directly. In other embodiments, signal quality information may be communicated between the SERDES to optimize the duty cycles. In other embodiments, the duty cycle may be updated as the system is operating, based on channel BER or other signal feedback mechanisms. In other embodiments, the duty cycle can be adjusted based on end user profile settings and preference for power savings versus operating margin.

Those of ordinary skill in the art will appreciate that the hardware, firmware/software utility, and software components and basic configuration thereof depicted in FIGS. 1 and 2 may vary. The illustrative components of IHS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 3:
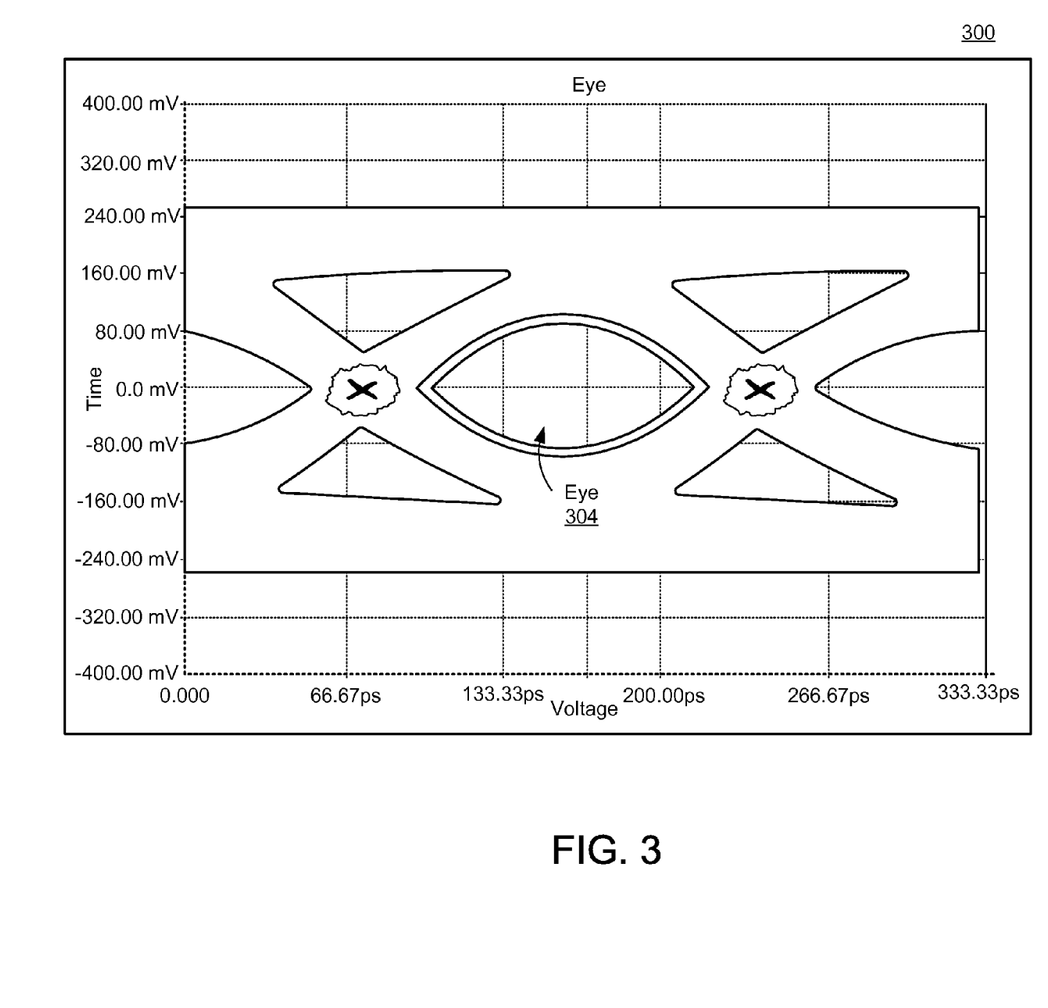
FIG. 3 illustrates an eye diagram associated with transmitter equalization, according to one embodiment.

FIG. 3 illustrates an eye diagram associated with transmitter equalization, according to one embodiment. Eye diagram 300 comprises eye (opening) 304 corresponding to a Serial Advanced Technology Attachment (SATA) 3.0 interface channel for which controller 150 (FIG. 1) has activated continuous equalization. The continuous equalization is equivalent to duty-cycled equalization performed using 100% duty cycle value. As illustrated, eye 304 represents a substantial eye opening. By applying continuous equalization, controller 150 prevents ISI effects from causing eye 304 from collapsing at high speeds.

Figure 4:
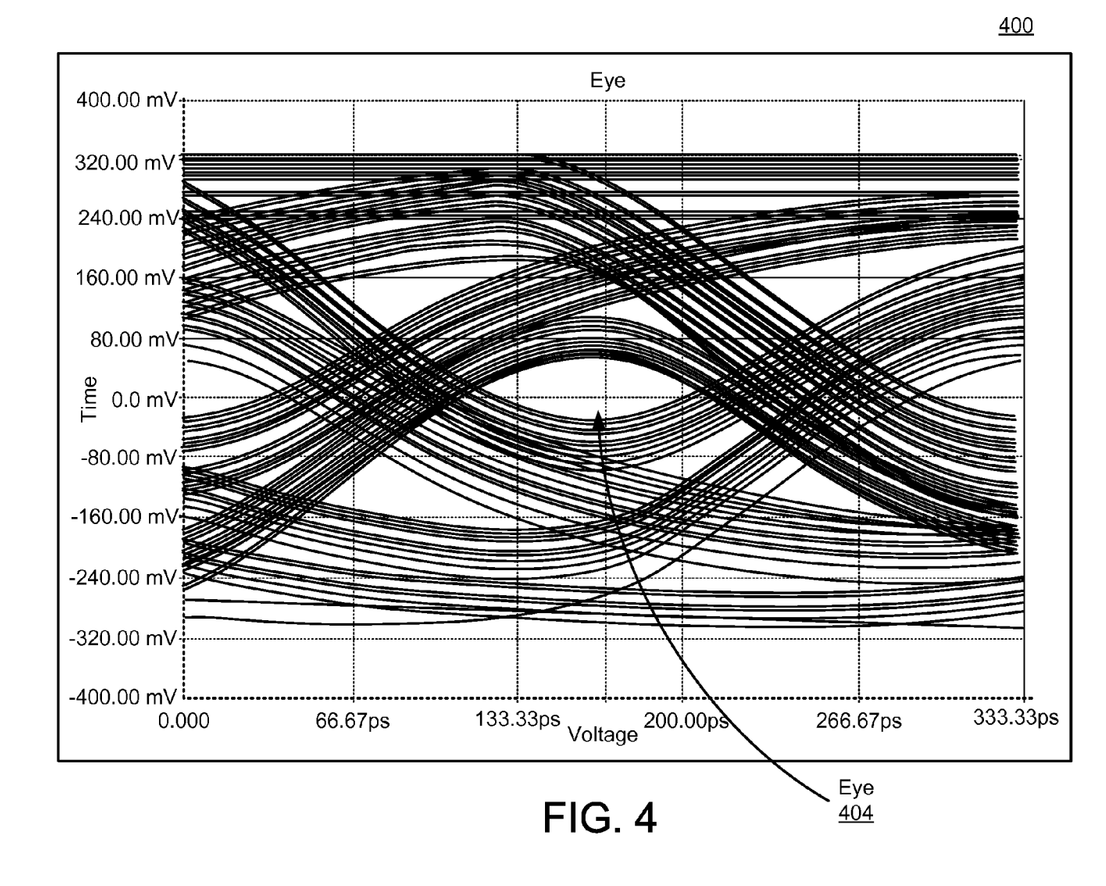
FIG. 4 illustrates an eye diagram associated with duty-cycled equalization, according to one embodiment.

FIG. 4 illustrates an eye diagram associated with duty-cycled equalization, according to one embodiment. Eye diagram 400 comprises eye (opening) 404 corresponding to a Serial Advanced Technology Attachment (SATA) 3.0 interface channel for which controller 150 (FIG. 1) has activated duty-cycled equalization, which is performed using 30-70% duty cycle values. In addition, controller 150 places equalization in an ON state for as few as 2000 bits. As illustrated, eye 404 represents an eye opening which is open to substantially a same extent as eye 304 of FIG. 3 in which equalization is turned "ON" 100% of the time. Thus, controller 150 is able to apply duty-cycled equalization that provides dependable and robust receiver operation. The duty-cycle mode of turning ON and OFF the equalization can be performed both periodically as well as non-periodically while providing a high performance impact.

While FIGS. 3 and 4 both illustrate eye diagrams depicting an "open eye", the figures are presented using different scales. This difference in the two scales causes the eye opening of FIG. 3 to appear to be a substantially larger eye opening than the eye opening of FIG. 4.

Figure 5:
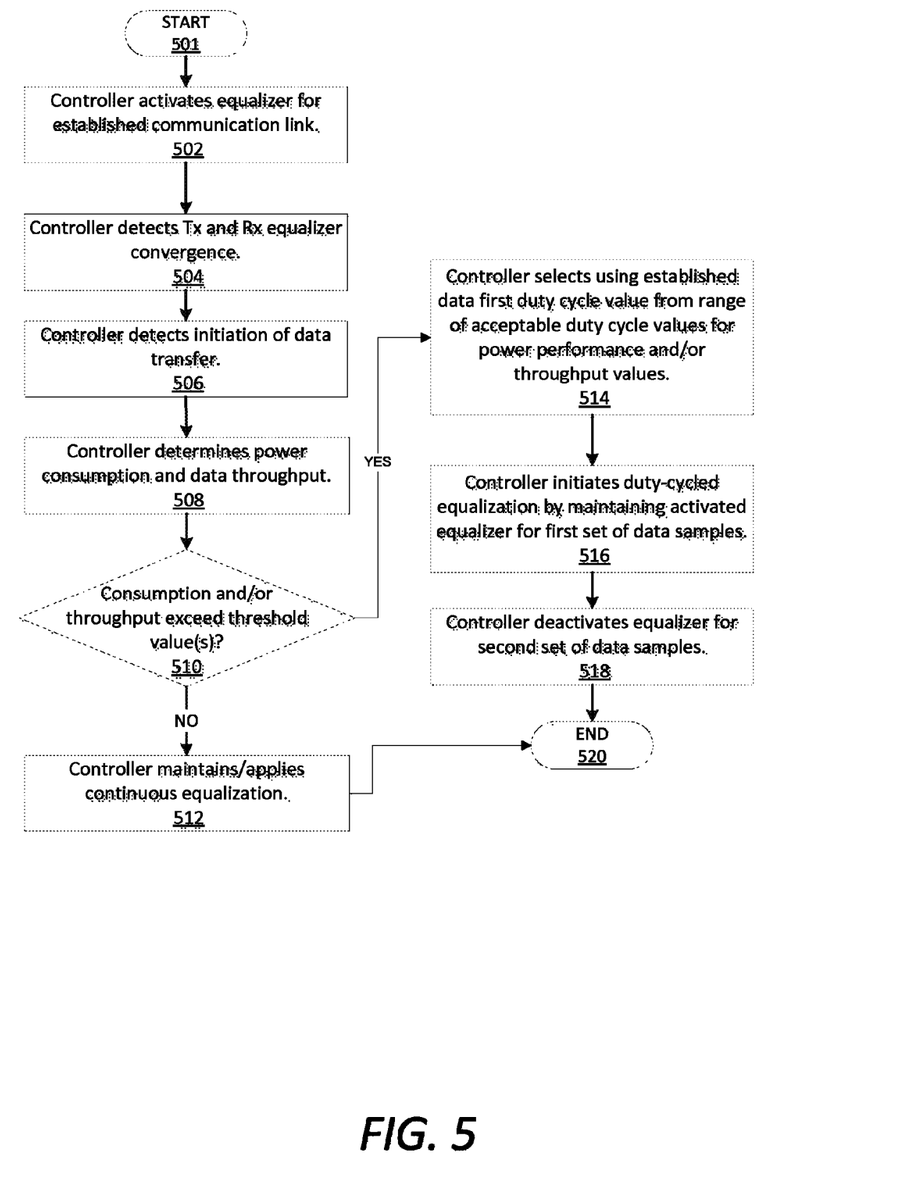
FIG. 5 is a flow chart illustrating a method for selectively providing duty-cycled equalization, in accordance with one or more embodiments.
Figure 6:
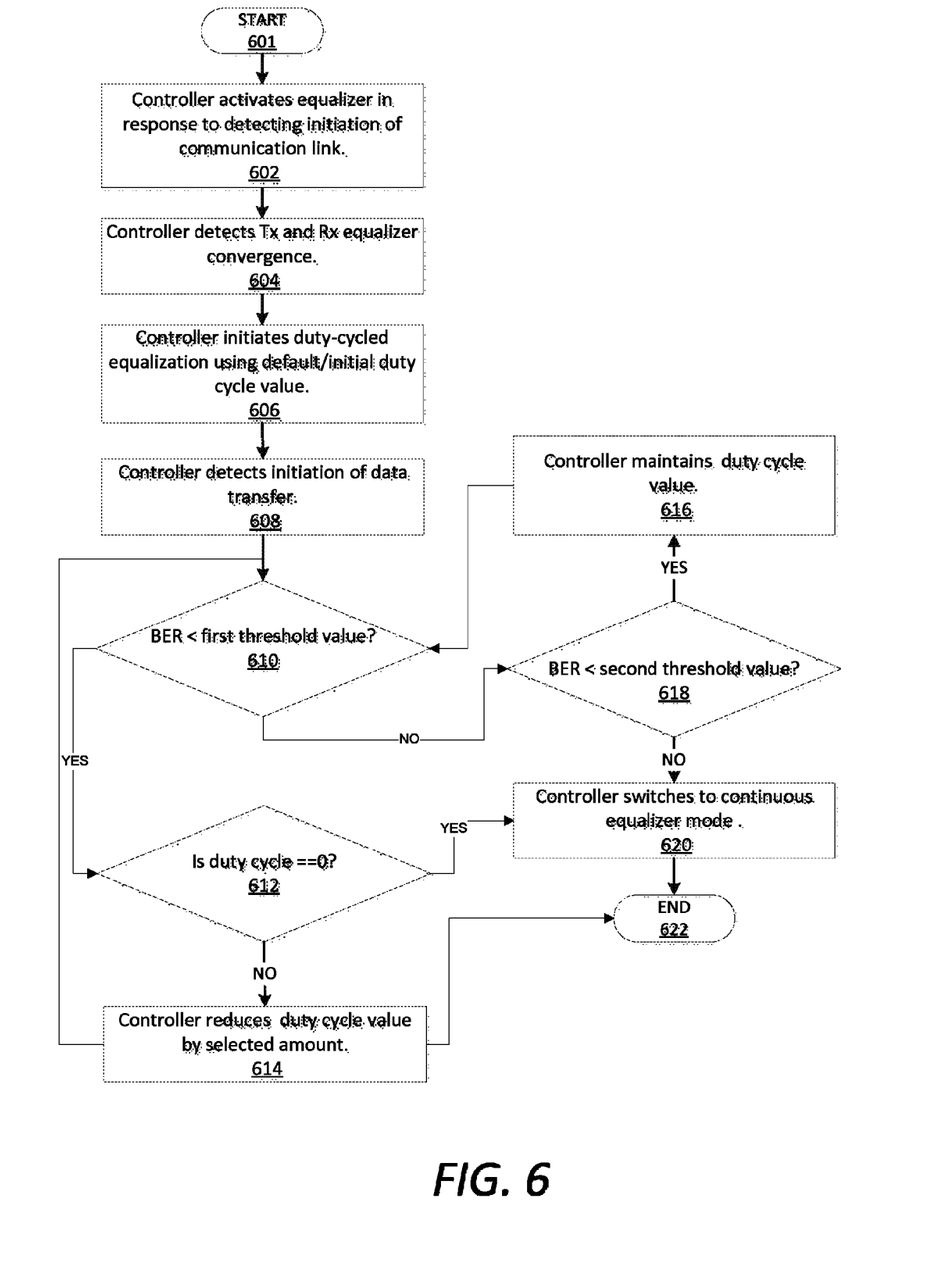
FIG. 6 is a flow chart illustrating a method for providing adjustments to duty cycle values during duty-cycled equalization, in accordance with one or more embodiments.
Figure 7:
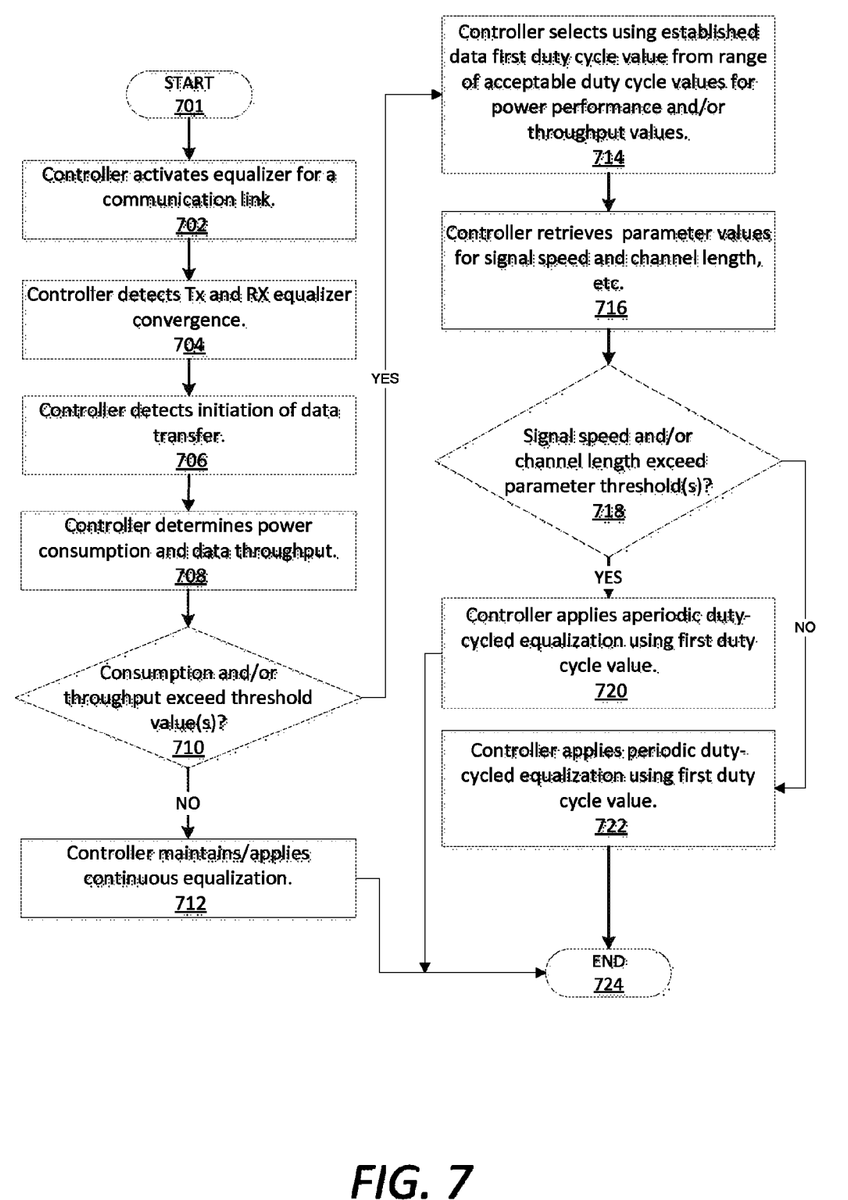
FIG. 7 is a flow chart illustrating a method for selectively providing periodic and aperiodic duty-cycled equalization, in accordance with one or more embodiments.

FIG. 5, FIG. 6 and FIG. 7 present flowcharts illustrating example methods by which IHS 100 and specifically controller 150 presented within the preceding figures performs different aspects of the processes that enable one or more embodiments of the disclosure. Generally, method 500, method 600, and method 700 collectively represent methods for selectively performing duty-cycled equalization within IHS 100. The description of each method is provided with general reference to the specific components illustrated within the preceding figures. It is appreciated that certain aspects of the described methods may be implemented via other processing devices and/or execution of other code/ firmware. In the discussion of FIG. 5, FIG. 6 and FIG. 7, reference is also made to elements described in FIG. 1-FIG. 4.

FIG. 5 illustrates an example method for selectively providing duty-cycled equalization. Method 500 begins at the start block 501 and proceeds to block 502 where controller 150 activates equalizer 118 associated with a communication link between a sending component and a receiving component. In one embodiment, transceiver 116 represents a first sending component targeting a first receiving component. However, in another embodiment, transceiver 116 represents a second receiving component that detects signal transmissions from a second sending component. In another example, processor 102 operating as a sending component can send requests/instructions to access memory 106 (receiving component) over a high speed interface. In this two-way exchange, memory 106 subsequently operates as a sending component to provide requested information to processor 102 now operating as a receiving component. Controller 150 detects TX and RX equalizer convergence (block 504). Controller 150 detects initiation of data transfer (block 506). Controller 150 determines power consumption associated with an activated equalizer 118 and/or data throughput for a corresponding signal transmission (block 508). Controller 150 determines whether power consumption and/or data throughput exceed respective threshold value(s) (decision block 510). If power consumption and/or data throughput do not exceed their respective threshold value(s), controller 150 maintains or applies continuous equalization in which equalization is activated for an entire duration of a corresponding signal transmission (block 512). However, if power consumption and/or data throughput exceed their respective threshold value(s), controller 150 selects a first duty cycle value from a range of acceptable/established duty cycle values for power performance and/or throughput values (block 514). Controller 150 initiates duty-cycled equalization by activating equalizer 118 for first set of data samples (block 516). Controller 150 deactivates equalizer 118 for a second set of data samples (block 518). For example, in one implementation in which equalizer 118 is a decision feedback equalizer (DFE) coupled to a receiver, controller 150 de-activates or turns off the DFE for a duration of selected bit intervals (e.g., every 1000 or 5000 bits). The DFE coefficients are previously determined during backchannel training/adaptation, and this determination allows controller 150 to subsequently enable turning on the DFE from an off position/state without requiring any data locking. The process ends at block 520.

FIG. 6 illustrates an example method for providing adjustments to duty cycle values during duty-cycled equalization. Method 600 begins at the start block 601 and proceeds to block 602 where controller 150 activates equalizer 118 in response to detecting establishment of a communication link between a sender and a receiver. In one embodiment, transceiver 116 represents a first sender targeting a first receiver. However, in another embodiment, transceiver 116 represents a second receiver that detects signal transmissions from a second sender. Controller 150 detects TX and RX equalizer convergence (block 604). Controller 150 initiates duty-cycled equalization using a default or initial duty cycle value determined using simulations and/or empirical analyses (block 606). Controller 150 detects initiation of data transfer between the sender and the receiver (block 608). Controller 150 determines whether an estimated bit error rate (BER) is less than a first threshold value retrieved from duty-cycled equalization data 114 (decision block 610). For example, in one implementation, controller 150 determines the BER by tracking a number of packets received as well as the number of cyclic redundancy check (CRC) errors determined during the course of packet transmission. If controller 150 determines that the estimated BER is less than the first threshold value, controller 150 determines whether the duty cycle value is substantially equal to zero (decision block 612). If controller 150 determines that the duty cycle value is substantially equal to zero, controller 150 switches from a duty-cycled equalizer mode to a continuous equalizer mode (block 620). If controller 150 determines that the duty cycle value is not substantially equal to zero, controller 150 reduces the duty cycle value by one of a dynamically selected or pre-established/programmed amount (block 614).

However, if controller 150 determines that the estimated BER is not less than the first threshold value, controller 150 determines whether the estimated BER is less than a second threshold value retrieved from duty-cycled equalization data 114 (decision block 618). If controller 150 determines that the estimated/measured BER is less than a second threshold value, controller 150 maintains a current duty cycle value (block 616). However, if controller 150 determines that the estimated BER is not less than the second threshold value, controller 150 switches from a duty-cycled equalizer mode to a continuous equalizer mode (block 620). For example, to maintain robust operations, controller 150 reverts back to a continuous equalization mode if excessive BER is encountered. The process ends at block 622.

FIG. 7 illustrates an example method for selectively providing periodic and aperiodic duty-cycled equalization. Method 700 begins at the start block 701 and proceeds to block 702 where controller 150 activates equalizer 118 associated with a communication link established between a sender and a receiver. Controller 150 detects TX and RX equalizer convergence (block 704). Controller 150 detects initiation of data transfer on the communication link (block 706). Controller 150 determines power consumption and/or data throughput associated with the data transfer over the communication link (block 708). Controller 150 determines whether power consumption and/or data throughput exceed respective threshold values retrieved from duty-cycled equalization data 114 (decision block 710). If power consumption and/or data throughput do not exceed respective threshold values, controller 150 maintains or applies continuous equalization (block 712). However, if power consumption and/or data throughput exceed respective threshold values, controller 150 selects a first duty cycle value from a range of acceptable or established duty cycle values for power performance and/or throughput values (block 714). Controller 150 retrieves parameter values for signal speed, channel length and/or other parameter values (block 716). Controller 150 determines whether at least one of signal speed and channel length exceeds respective parameter thresholds retrieved from duty-cycled equalization data 114 (decision block 718). If the at least one of signal speed and channel length exceed respective parameter thresholds, controller 150 applies aperiodic duty-cycled equalization using the first duty cycle value (block 720). However, if the at least one of signal speed and channel length do not exceed parameter thresholds, controller 150 applies periodic duty-cycled equalization using the first duty cycle value (block 722). The process ends at block 724.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   at least one transceiver;
   at least one data communication interface connecting a sending component to a receiving component;
   an equalizer coupled to said at least one transceiver; and
   a controller coupled to said transceiver and to said equalizer, and which:
   detects propagation of a communication signal over the communication interface;
   selects, using a power consumption specification and a data throughput specification, an equalization to be applied to the propagating communication signal from among a continuous equalization and a duty-cycled equalization;
   wherein the controller selects the equalization based on a determination of whether at least one of an expected power consumption performance for duty-cycled equalization and an expected data throughput corresponding to the duty-cycled equalization exceeds respective established performance thresholds for activating duty-cycled equalization; and
   performs the equalization selected for the communication signal.

2. The IHS of claim 1, wherein the controller:
   initiates duty-cycled equalization for the communication signal in response to determining that at least one of the expected power consumption performance for duty-cycled equalization and the expected data throughput corresponding to the duty-cycled equalization exceed the respective established performance thresholds; and wherein the duty-cycled equalization provides a first interval during which the equalizer is activated and a second interval during which the equalizer is de-activated.

3. The IHS of claim 2, wherein to initiate duty-cycled equalization the controller:
evaluates one or more of (i) a length of a corresponding propagation path, (ii) an estimated amount of power savings, and (iii) a corresponding signal propagation speed to determine whether to select a specific type of equalization from among periodic duty-cycled equalization and aperiodic duty-cycled equalization;
selects aperiodic duty-cycled equalization in response to an occurrence of at least one of the following conditions: (a) an identified propagation path is shorter than a threshold length; (b) signal propagation speed exceeds a threshold speed value; and (c) a threshold amount of power can be saved; and
selects periodic duty-cycled equalization when none of the at least one of the conditions occurs.

4. The IHS of claim 3, wherein to select periodic duty-cycled equalization the controller:
calculates an acceptable period for the periodic duty-cycled equalization by determining at least one of a bit error rate (BER) and signal quality information of a corresponding serial link; and
provides periodic duty-cycled equalization using the calculated acceptable period.

5. The IHS of claim 3, wherein to select aperiodic duty-cycled equalization the controller:
selects one or more duty cycle values associated with aperiodic duty-cycled equalization based on at least one of (i) specified power performance values and (ii) specified throughput values, wherein each duty cycle value corresponds to a respective duty cycle interval from among a sequence of duty cycle intervals, and duty cycle values vary from one duty cycle interval to a next, sequential duty cycle interval, and each duty cycle interval corresponds to a respective signal sample set having a specified sample size; and
initiates aperiodic duty-cycled equalization using the one or more duty cycle values which correspond to a sequence of duty cycle intervals.

6. The IHS of claim 2, wherein to initiate duty-cycled equalization the controller:
identifies parameters associated with applying duty-cycled equalization, which parameters can include at least one of a duty cycle value, average duty cycle, identification of the first interval for duty-cycled equalization, and identification of the second interval for duty-cycled equalization; and
selects values for the identified parameters based on at least one of: system settings; user profile settings; and an indicated preference for one of an increased power savings and an increased operating margin.

7. The IHS of claim 6, wherein the controller:
activates duty-cycled equalization using the selected parameter values to control at least one of firmware configuration, a selection of equalization coefficients, and a status of associated enable signals.

8. The IHS of claim 1, wherein the controller:
provides continuous equalization in response to determining that at least one of the expected power consumption performance for duty-cycled equalization and the expected data throughput corresponding to the duty-cycled equalization does not exceed the respective established performance thresholds.

9. The IHS of claim 8, wherein to provide continuous duty-cycled equalization the controller:
determines a range of acceptable duty cycle values corresponding to at least one of specified power performance values and specified throughput values, wherein, each duty cycle value within the range of acceptable duty cycle values can be utilized, during a respective periodic time interval, to provide duty-cycled equalization by which equalization is performed for a corresponding first number of data samples and equalization is disabled for a corresponding second number of data samples;
selects a first duty cycle value from the range of acceptable duty cycle values; and
initiates equalization using the selected first duty cycle value.

10. A method performed within an information handling system having a controller and a transceiver, the method comprising:
detecting propagation of a communication signal over a communication interface;
a controller selecting, using a power consumption specification and a data throughput specification, an equalization to be applied to the propagating communication signal from among a continuous equalization and a duty-cycled equalization,
wherein the controller selects the equalization based on determining whether at least one of an expected power consumption performance for duty-cycled equalization and an expected data throughput corresponding to the duty-cycled equalization exceeds respective established performance thresholds for activating duty-cycled equalization; and
performing the equalization selected for the communication signal.

11. The method of claim 10, further comprising:
in response to determining that at least one of the expected power consumption performance for duty-cycled equalization and the expected data throughput corresponding to the duty-cycled equalization exceed the respective established performance thresholds, initiating duty-cycled equalization for the communication signal;
wherein the duty-cycled equalization provides a first interval during which the equalizer is activated and a second interval during which the equalizer is de-activated.

12. The method of claim 11, wherein said initiating duty-cycled equalization further comprises:
evaluating one or more of (i) a length of a corresponding propagation path, (ii) an estimated amount of power savings, and (iii) a corresponding signal propagation speed to determine whether to select a specific type of equalization from among periodic duty-cycled equalization and aperiodic duty-cycled equalization;
selecting aperiodic duty-cycled equalization in response to an occurrence of at least one of the following conditions: (a) an identified propagation path is shorter than a threshold length;
(b) signal propagation speed exceeds a threshold speed value; and (c) a threshold amount of power can be saved; and
selecting periodic duty-cycled equalization when none of the at least one of the conditions occurs.

13. The method of claim 12, wherein said selecting periodic duty-cycled equalization further comprises:

calculating an acceptable period for the periodic duty-cycled equalization by determining at least one of a bit error rate (BER) and signal quality information of a corresponding serial link; and providing periodic duty-cycled equalization using the calculated acceptable period.

14. The method of claim 12, wherein said selecting aperiodic duty-cycled equalization further comprises:

selecting one or more duty cycle values associated with aperiodic duty-cycled equalization based on at least one of (i) specified power performance values and (ii) specified throughput values, wherein each duty cycle value corresponds to a respective duty cycle interval from among a sequence of duty cycle intervals, and duty cycle values vary from one duty cycle interval to a next, sequential duty cycle interval, and each duty cycle interval corresponds to a respective signal sample set having a specified sample size; and initiating aperiodic duty-cycled equalization using the one or more duty cycle values which correspond to a sequence of duty cycle intervals.

15. The method of claim 11, wherein said initiating duty-cycled equalization further comprises:

identifying parameters associated with applying duty-cycled equalization, which parameters can include at least one of a duty cycle value, average duty cycle, identification of the first interval for duty-cycled equalization, and identification of the second interval for duty-cycled equalization; and selecting values for the identified parameters based on at least one of: system settings; user profile settings; and an indicated preference for one of an increased power savings and an increased operating margin.

16. The method of claim 15, further comprising:

activating duty-cycled equalization using the selected parameter values to control at least one of firmware configuration, a selection of equalization coefficients, and a status of associated enable signals.

17. The method of claim 10, further comprising:

in response to determining that at least one of the expected power consumption performance for duty-cycled equalization and the expected data throughput corresponding to the duty-cycled equalization does not exceed the respective established performance thresholds, providing continuous equalization.

18. The method of claim 17, wherein said providing duty-cycled equalization further comprises:

determining a range of acceptable duty cycle values corresponding to at least one of specified power performance values and specified throughput values, wherein, each duty cycle value within the range of acceptable duty cycle values can be utilized, during a respective periodic time interval, to provide duty-cycled equalization by which equalization is performed for a corresponding first number of data samples and equalization is disabled for a corresponding second number of data samples;

selecting a first duty cycle value from the range of acceptable duty cycle values; and initiating equalization using the selected first duty cycle value.

* * * * *